US012653176B2

(12) United States Patent
Elfferich et al.

(10) Patent No.: US 12,653,176 B2
(45) Date of Patent: Jun. 16, 2026

(54) WEEDING ROBOT MECHANISM

(71) Applicant: ODD.BOT B.V., The Hague (NL)

(72) Inventors: Johannes Frederik Elfferich, Delft (NL); Martijn Roland Lukaart, 's-Gravenhage (NL); Rudolf Paulus Maria Van De Weijer, Bladel (NL)

(73) Assignee: ODD.BOT B.V., The Hague (NL)

( * ) Notice: Subject to any disclaimer, the term of this patent is extended or adjusted under 35 U.S.C. 154(b) by 512 days.

(21) Appl. No.: 18/249,536

(22) PCT Filed: Oct. 19, 2021

(86) PCT No.: PCT/NL2021/050630
§ 371 (c)(1),
(2) Date: Apr. 18, 2023

(87) PCT Pub. No.: WO2022/086322
PCT Pub. Date: Apr. 28, 2022

(65) Prior Publication Data
US 2024/0000060 A1    Jan. 4, 2024

(30) Foreign Application Priority Data

Oct. 19, 2020    (NL) ..................................... 2026700

(51) Int. Cl.
*A01M 21/02*        (2006.01)
*B25J 9/16*          (2006.01)
(Continued)

(52) U.S. Cl.
CPC ............ *A01M 21/02* (2013.01); *B25J 9/1697* (2013.01); *B25J 11/005* (2013.01); *B25J 15/0019* (2013.01)

(58) Field of Classification Search
CPC ..................................................... A01M 21/02
See application file for complete search history.

(56) References Cited

U.S. PATENT DOCUMENTS 10,681,905 B2    6/2020   Tanner et al.
2006/0241807 A1*  10/2006  Daniels ................... G07F 11/62
700/235

(Continued)

FOREIGN PATENT DOCUMENTS

CN    101707992 B    1/2011
CN    101990796 B    7/2012
(Continued)

OTHER PUBLICATIONS

English Translation of CN-107600202-A (Year: 2018).*

(Continued)

*Primary Examiner* — Claude J Brown
(74) *Attorney, Agent, or Firm* — Chiesa Shahinian & Giantomasi PC

(57) ABSTRACT

An end effector for a weeding robot is provided, including an end effector frame arranged to be connected to a robot arm, a plurality of rotation members, each rotation member being rotatably connected to the end effector frame, and each rotation member being arranged to be rotated around an
(Continued)

200 individual rotation axis, wherein the rotation axes are disposed on a circle, and wherein each rotation member comprises a radially extending finger, of which distal ends extend to a center of the circle on which the rotation axes are disposed when the end effector is in a closed state.

18 Claims, 3 Drawing Sheets

(51) Int. Cl.
  *B25J 11/00*            (2006.01)
  *B25J 15/00*            (2006.01)

(56)                    References Cited

U.S. PATENT DOCUMENTS

| | | | | |
|---|---|---|---|---|
| 2011/0089709 A1* | 4/2011 | Neeper | | B66C 1/44 |
| | | | | 294/119.1 |
| 2013/0019697 A1* | 1/2013 | McKeen | | G01N 35/00029 |
| | | | | 73/863.21 |
| 2014/0036276 A1* | 2/2014 | Gross | | G01B 11/02 |
| | | | | 356/402 |

| | | | | | |
|---|---|---|---|---|---|
| 2017/0238460 A1* | 8/2017 | MacKean | | | A01D 34/008 |
| 2019/0297869 A1 | 10/2019 | Michaels et al. | | | |

FOREIGN PATENT DOCUMENTS

| | | | | | |
|---|---|---|---|---|---|
| CN | 202907683 U | | 5/2013 | | |
| CN | 107600202 A | * | 1/2018 | | |
| CN | 109890203 A | | 6/2019 | | |
| CN | 109964913 A | | 7/2019 | | |
| DE | 102016215566 A1 | | 2/2018 | | |
| DE | 102017214332 A1 | * | 2/2018 | | B25J 15/10 |
| EP | 3332640 A1 | * | 6/2018 | | A01M 21/02 |
| EP | 3192342 B1 | | 10/2019 | | |
| RU | 2694588 C1 | | 7/2019 | | |
| WO | 2017002093 A1 | | 1/2017 | | |
| WO | 2018033370 A1 | | 2/2018 | | |

OTHER PUBLICATIONS

English Translation of DE-102017214332-A1 (Year: 2018).*
English Translation of EP-3332640-A1 (Year: 2018).*
International Search Report and Written Opinion mailed Jan. 20, 2022, in connection with International Patent Application No. PCT/NL2021/050630, 12 pgs.

* cited by examiner

100

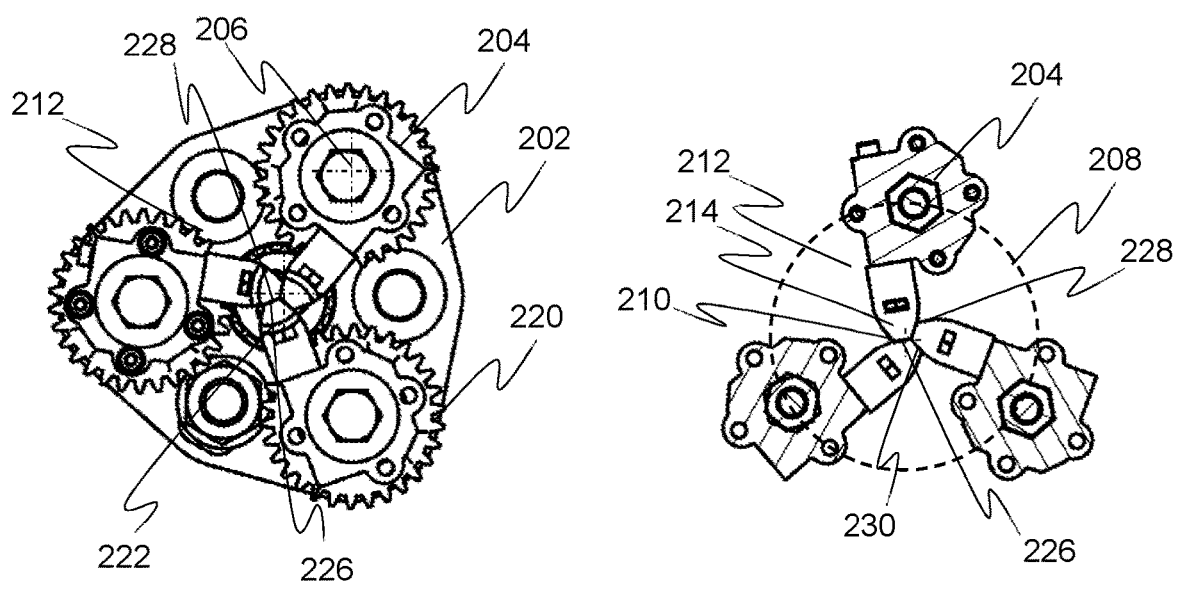
FIG 3A                                    FIG 3B
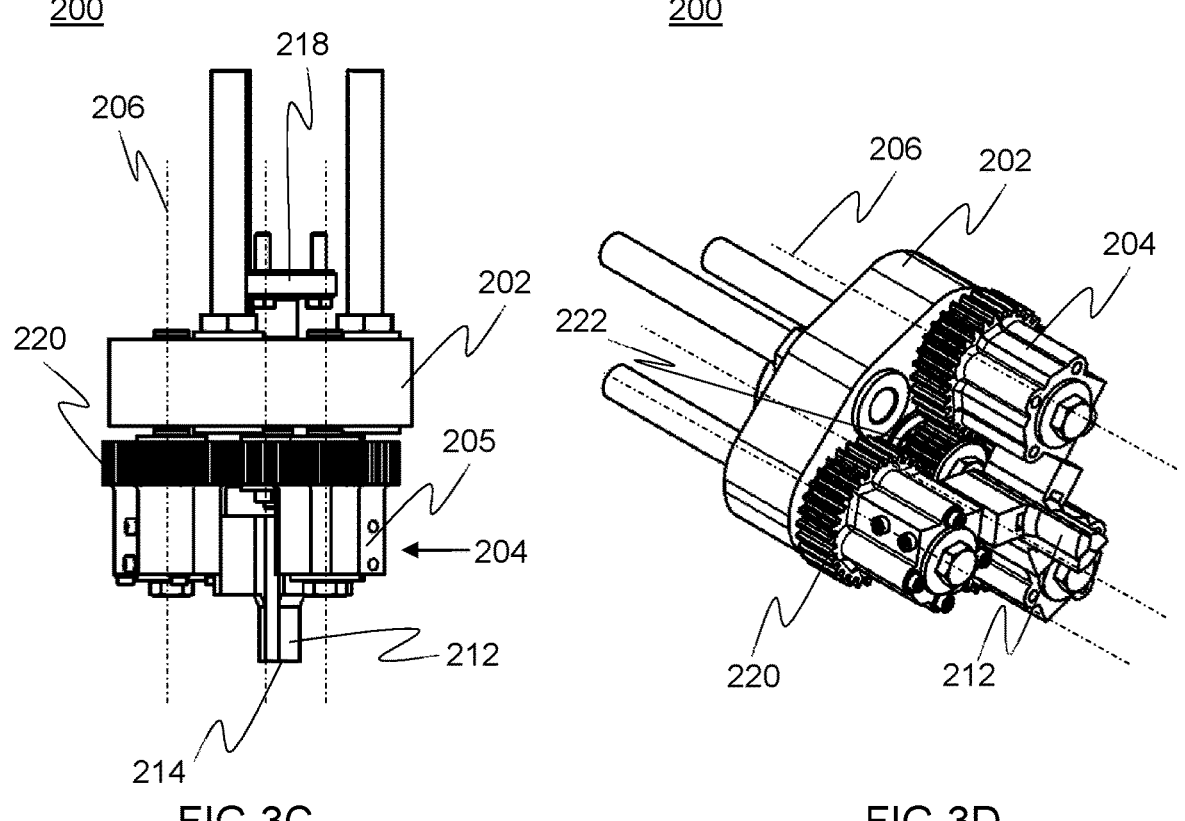
FIG 3C                                    FIG 3D

WEEDING ROBOT MECHANISM

CROSS-REFERENCE TO RELATED APPLICATION(S)

This application is a National Stage under 35 U.S.C. 371 of International Patent Application No. PCT/NL2021/050630, filed Oct. 19, 2021, which claims priority to the Netherlands Patent Application No. 2026700, filed Oct. 19, 2020; the disclosures of all of which are incorporated herein by reference in their entireties.

TECHNICAL FIELD

The aspects and embodiments thereof relate to mechanisms for weeding robots.

BACKGROUND

Heavy tractors are commonly used to dispense herbicide on all the plants within a cultivated field, as this is a fast method to kill weeds. The entire surface of the cultivated field is thus sprayed, without distinction about whether there are weeds to destroy or not.

WO2017002093 discloses a method using a robot for an automatic treatment of a weed. The method comprises steps of capturing images of said weed with a camera on said robot, determining with said images a distance between the weed and a second vegetable organism; and selecting a treatment tool of said robot for a treatment of the weed from a group of treatment tools as function of said distance. WO2017002093 further concerns a robotic vehicle for carrying out the method for an automatic treatment of a weed. The known robotic vehicle uses a combination of mechanical tools and spraying tools for destroying unwanted weeds.

SUMMARY

It is preferred to provide for an improved mechanical weed destruction tool, for example such that use of any herbicide may be prevented.

A first aspect provides an end effector for a weeding robot, for example a mechanical weed destruction and/or removal tool. The end effector comprises an end effector frame, for example arranged to be connected to a robot arm or a robot frame, a plurality of rotation members, each rotation member being rotatably connected to the end effector frame, and each rotation member being arranged to be rotated around an individual rotation axis, wherein the rotation axes of the rotation members are disposed on a circle with a substantially constant diameter, and wherein each rotation member comprises a substantially radially extending finger, of which distal ends extend to a center of the circle on which the rotation axes are disposed when the end effector is in a closed state.

In embodiments, the distal ends of the radially extending fingers may substantially extend away from or may be at least not directed towards the center of the circle on which the rotation axes are disposed when the end effector is in an open state. In the open state, a space is provided between the fingers for receiving a weed therein.

The end effector may for example be a gripping tool, a cutting tool, a punching tool or a combination thereof, for the removal and/or destruction of weed or any other unwanted type of unwanted flora. The end effector may for example be electrically, hydraulically, magnetically, mechanically, pneumatically, humanly powered or a combination thereof. Physical properties of the end effector such as, but not limited to, geometrical properties and sharpness may be chosen according to the type of weed or unwanted type of flora which has to be removed.

The weeding robot may for example be an autonomic unit capable of moving across a surface, such as a field or a garden, using wheels, tracks other means or a combination thereof. The weeding robot may be capable of detecting and scanning its surroundings and finding weeds or other unwanted flora to remove. To this end, the weeding robot may be equipped with different types of scanners, for example optical scanners such as one or more cameras, but also supporting equipment such as sources of light. An optical scanner may be arranged to operate using visible light and/or light in any other spectrum such as infrared or near infrared, for example approximately between 700 nm and 1800 nm or approximately between 860 nm and 1600 nm. The weeding robot may be powered by, for example but not limited to, batteries or conventional fuels.

The end effector frame may for example be embodied as a wire frame or may be a substantially solid frame. The end effector frame may comprise, for example but not limited to, metals, polymers or a combination thereof. The end effector frame may be used to position the end effector over the targeted location, using for example a stage with multiple degrees of freedom, a delta-arm, any other translational/rotational system or combination thereof.

The plurality of rotation members may for example be embodied as a set of at least two rotation members which may be rotated about their individual rotation axis. Each rotation member may be rotated by a single drive member that is rotationally coupled to the plurality of rotation members by, for example but not limited to, gears, belts, chains or any combination thereof. Rotationally coupled implies that when the drive member rotates, the rotation members also rotate. A rotational speed and/or direction of the rotation members may differ from the drive member, for example by a particular gear ratio.

Embodiment of the end effector may hence comprise a drive member, rotatably connected to the end effector frame and rotationally coupled to each rotation member. As an option, a rotation axis of the drive member may be substantially aligned with the center of the circle on which the rotation axes of the rotation members are disposed.

For example for rotationally coupling the drive member and the rotation members, the drive member and the rotation members may each comprise a gear section, wherein the gear section of the drive member may be meshed with the gear sections of each of the rotation members.

The individual rotation axis may for example be spaced at a radial distance from the center of the end-effector, substantially perpendicular to a plane that is parallel to the surface where the weeding robot is placed on.

The radially extending fingers may extend radially relative to the rotation axis of their respective rotation member, and optionally eccentrically relative to the rotation axis of the respective rotation member by which the radially extending finger is comprised.

As an option, one, multiple or each radially extending finger may comprise an end plane and two side planes tapered towards the end plane. Hence, in use, from a top view, a finger may have an at least partially tapered shape. A taper angle of the side planes may be equal or different.

In particular, a first of the two side planes may be a gripper plane, a second of the two side planes may be a cutting plane, in a first closed state, gripper planes of the radially extending fingers may engage end planes of adjacent radially extending fingers, and in a second closed state, cutting planes of the radially extending fingers may engage end planes of another adjacent radially extending finger.

As an alternative, a first of the two side planes is a gripper plane, a second of the two side planes is an alternative gripper plane, in a first closed state, gripper planes of the radially extending fingers engage end planes of adjacent radially extending fingers, and in a second closed state, alternative gripper planes of the radially extending fingers engage end planes of another adjacent radially extending finger.

A gripper plane engaging an end plane may imply contact between the gripper plane and the end plane. Also, a cutting plane engaging an end plane may imply contact between the cutting plane and the end plane.

As an even further alternative, a first of the two cutting planes is a gripper plane, a second of the two side planes is an alternative cutting plane, in a first closed state, gripper planes of the radially extending fingers engage end planes of adjacent radially extending fingers, and in a second closed state, alternative cutting planes of the radially extending fingers engage end planes of another adjacent radially extending finger.

A sensor may be used for determining whether a weed is present between the fingers, for example by sensing a power consumption of a motor rotating the fingers, a rotational speed of a rotation member, position of a finger, torque supplied by the motor, any parameter indicative of any of these parameters, or a combination thereof.

At least one of the first side plane and the second side plane may be oriented substantially parallel to the rotation axis of the respective rotation member. In use, the rotation axes of the rotation members may be substantially parallel to the gravity vector.

As an option, one or more of the fingers may extend away from the end effector frame beyond the rotation members. As such, for example, when the end effector is in use moved down towards a weed, the fingers are the first component of the end effector to engage the weed. For example, the fingers may punch down on the weed for destroying the weed.

A second aspect provides a weeding robot, which may be a substantially autonomous robot. Substantially autonomous implies that after being programmed to perform a particular task, no further human intervention or control is required during performance of the task. For example, this task may be to clear a particular area of particular kinds of weeds.

The weeding robot comprises a robot frame. a propulsion module for moving the robot frame, for example across a field, through the air or through a body of water, and an optional robot arm connected to the robot frame, with an end effector for example according to the first aspect connected at a distal end of the robot arm or to the robot frame.

Embodiments of the weeding robot may comprise a vision module for obtaining weed data. Weed data may for example be a video stream or one or more photos in which weed is visible. From one or more photos or video frames, a type of weed as an example of weed data may be identified, for example by a controller with a processing unit. Furthermore, from one or more photos or video frames, weeds may be distinguished from crops which are not be removed and preferably not damaged. The fact that a particular plant is identified as being weeds may also be considered as being weed data.

A vision module may comprise one or more lights for sending an optical signal which may be reflected back by the plants such as weeds and crops to an optical sensor, optical sensors such as one or more cameras or LIDARs, RADAR, any other optical sensor, or any combination thereof. An optical signal may comprise light of any wavelength or combination of wavelengths.

As a further option, embodiments of the weeding robot may comprise a controller for controlling the optional robot arm and the end effector based on the obtained weed data. The controller may comprise an electronic processing unit, and may be arranged to receive data from the vision module and process this data into weed data.

Based on the weed data, the controller may be arranged for operating the end effector in at least one of a cutting mode and a gripping mode. For example, the weed data may be indicative of a type of weed and/or a particular dimension of the weed such as a height and/or a thickness of a stem. In the cutting mode, the end effector may be operated.

The controller may comprise a navigation unit for controlling a propulsion module for moving the robot to a particular location or along a particular path, for example based on GPS data.

The weeding robot may comprise a rotational actuator such an electric motor for rotating one or more rotational members of the end effector. The rotational actuator may be controllable by the controller. The controller may control the rotational actuator to rotate in a first direction for a first mechanical destruction action of the end effector, and in a second direction for a second mechanical destruction action of the end effector.

The rotational actuator may be connected to the robot frame and connected to the end effector for example via a cardan shaft. Alternatively, the rotational actuator may be placed on the end effector, and only electrical power and an optional control signal may have to be supplied to the end effector for powering and optionally controlling the rotational actuator. It will be appreciated that one or more rotational actuators may be used for rotating different components of the end effector.

The force with which the fingers are moved into the closed state may be controlled by controlling a torque supplied by the rotational actuator. Using the rotational actuator, a rotational position of the fingers may be controlled. As such, a gripping space between the fingers may be controlled. A larger gripping space may be required for thicker stems of weed. Hence, the gripping space may be determined based on weed data. Also, when a gripping space is present, the end effector may be considered to be in a closed position if the gripping space is small enough for gripping onto weed with a particular thickness.

A third aspect provides a method for operating an end effector of a weeding robot, comprising obtaining weed data on a weed using a vision module of the weeding robot, based on the weed data, determining whether to perform a cutting action on the weed using the end effector, and/or perform a gripping action on the weed using the end effector, and/or optionally to perform a punching action on the weed using the end effector. The method further comprises performing the determined action for mechanically destroying the weed.

The first mechanical destruction action may be a gripping action. The second mechanical destruction action may be an alternative gripping action. The second mechanical destruction action may alternatively be a cutting action. The third mechanical destruction action may be a punching action.

Preferably, the method is performed using an end effector capable of performing a cutting action as well as a gripping action, and even more preferably also capable of performing a punching action, such as an end effector according to the first aspect. Preferably, the method is for operating an end effector of a weeding robot according to the second aspect.

The step of performing the first mechanical destruction action may comprise rotating rotation members of the end effector in a first direction, and the step of performing the second mechanical destruction action may comprise rotating rotation members of the end effector in a second direction, opposite to the first direction.

A gripping action may comprise gripping a weed and pulling the weed from the soil. Optionally, the gripping action may further comprise rotating or twisting the weed, which may allow the weed to be pulled out of the soil in its entirety, including any root. During the gripping action, one or more fingers may penetrate into the soil to grip roots of the weed, optionally together with gripping other parts of the weed which extend above the soil.

When an end effector is arranged to perform a gripping action and an alternative gripper action, this gripping action for example may make use of different gripping planes. Gripping planes may differ for example in size, material, and/or surface roughness. Also in closed state, in different gripping action, end planes and side planes of fingers may be at a different orientation and/or distance relative to each other.

Embodiments of the end effector may also be arranged for performing substantially the same gripping action in both closed states. As such, the time between two gripping actions may be reduced compared to an end effector only capable of performing a single gripping action. For ending a gripping action, the fingers have to be moved away from each other for releasing the weed. When two gripping actions are possible, during the releasing step of the first gripping action, the closing action of the second gripping action is already started.

As a further option, the end effector may be arranged for performing a punching action. This action may be less time consuming than a gripping action or a cutting action since the position of the fingers does not have to change in between two consecutive punching actions.

The step of performing the first mechanical destruction action may comprise rotating rotation members of the end effector in a first direction, and the step of performing the second mechanical destruction action may comprise rotating rotation members of the end effector in a second direction, opposite to the first direction.

It will be appreciated that different options disclosed herein may be readily combined to form different embodiments of the end effector, weeding robot and method for operating an end effector of a weeding robot. Options disclosed in conjunction with one aspect may be readily applied to embodiments of another aspect.

BRIEF DESCRIPTION OF THE FIGURES

In the figures,

FIGS. 3A, 3B, 3C and 3D depict the mechanical weed destruction tool in a closed state.

DETAILED DESCRIPTION OF THE FIGURES

Figure 1:
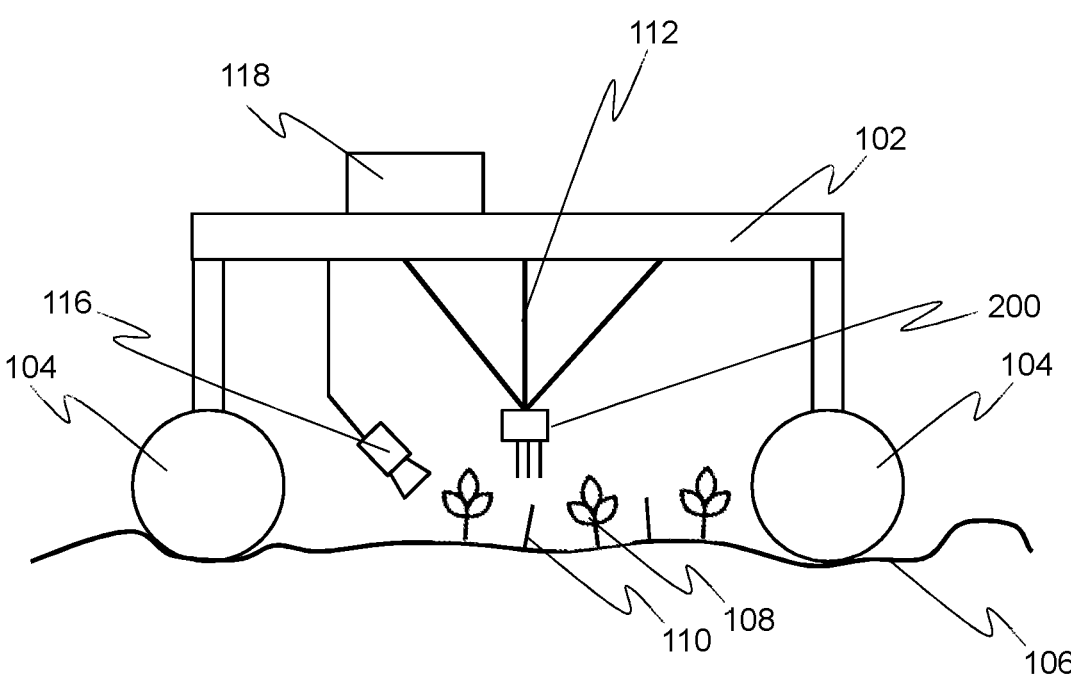
FIG. 1 depicts an embodiment of a weeding robot.

FIG. 1 schematically depicts a weeding robot 100, comprising a robot frame 102 and a set of wheels 104 as part of a propulsion module. The propulsion module may further comprise a motor, such as an electric motor or an internal combustion engine for rotating the set of wheels 104.

Alternatively, the robot 100 may be a flying robot such as a drone, wherein the propulsion module is arranged for allowing the robot 100 to fly. The propulsion module may as such comprise one or more rotatable blades and/or propellers and one or more motors for rotating the blades and/or propellers. Optionally, when the robot 100 is a drone, no robot arm is required and the end effector may be directly connected to the robot frame.

In the embodiment of FIG. 1, the robot 100 is arranged to move across a field 106 in which crop 108 is growing. Also growing on the field 106 is undesired weed 110, which is to be removed, damaged or destroyed to prevent the weed 110 from growing further. Preferably, no herbicides are used for destroying the weed 110. Destroying or damaging weeds may imply that the weed is manipulated such that it cannot grow any further.

Connected to the robot frame 102 is a delta robot 112 as an example of a robot arm. The delta robot 112 is a parallel robot comprising three arms connected to universal joints at the robot frame 102. In alternative embodiments, the robot arm may for example be a Stewart platform, SCARA robot, or any other type of robot arm arranged for moving the end effector in at least one degree of freedom, and preferably over three orthogonal translational degrees of freedom.

At a distal end of the delta robot 112, a mechanical weed remover 200 as an end effector is provided. As such, the delta robot 112 may be used to control at least one degree of freedom of the weed remover 200, and preferably, the delta robot 112 may be used to control three translational degrees of freedom of the weed remover 200.

The robot 100 as an option further comprises a camera 116 as a vision module or as part of a vision module for obtaining weed data. A field of view of the camera 116 may be directed to the field 106 such that the camera 116 may be used for obtaining weed data. Weed data may for example be a position of a weed 110, which may be a set of absolute coordinates, or a position relative to another part of the robot 100, such as the robot frame 102 or the end effector 200. The end effector 200 may also be in the field of view of the camera 116. Multiple cameras may be used to expand the field of view, and/or to obtain a stereo view for example allowing a depth map to be created.

As a further option, the robot 100 comprises a controller 118 for operating the end effector 200. The controller 118 may be arranged for receiving a vision signal and/or weed data from the camera 116. Based on the received vision signal and/or weed data, the controller 118 may control at least one of the delta robot 112 and the end effector 200. The end effector 200 may for example be controlled in different modes, such as one or more of a cutting mode, gripping mode, pulling mode and/or punching mode.

FIGS. 2A, 2B, 2C and 2D depict a mechanical weed destruction tool 200 as an example of an end effector. The weed destruction tool 200 comprises a tool frame 202 as an end effector frame. Rotatably connected to the tool frame 202 are three rotation members 204 as an example of a plurality of rotation members. For clarity of the figures, only one of the rotation members 204 is provided with a reference number. Preferably, the rotation members are substantially identical in shape.

Figures 2A, 2B, 2C, 2D:
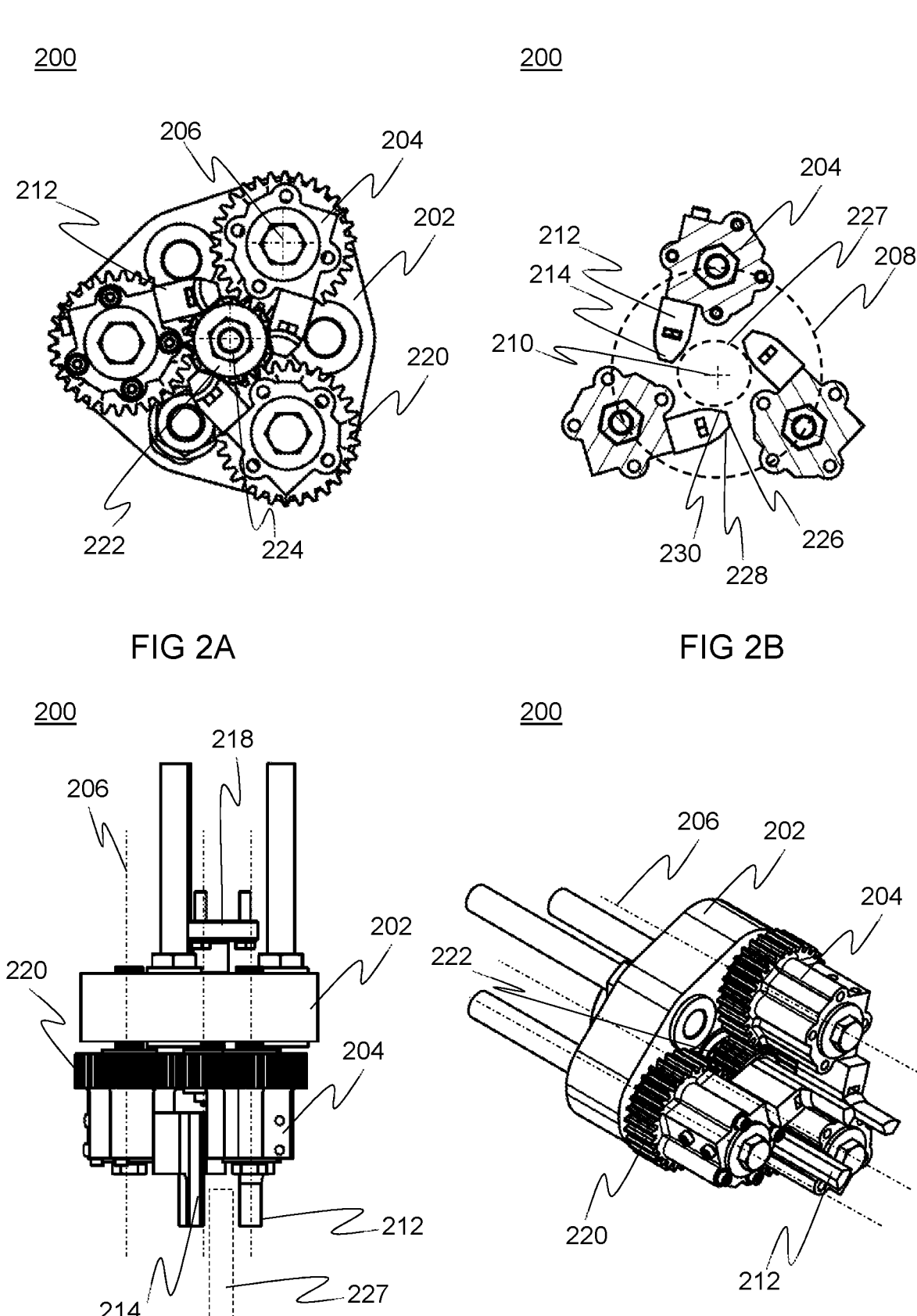
FIGS. 2A, 2B, 2C and 2D depict a mechanical weed destruction tool in an open state.

Each rotation member 204 is arranged to be rotated around their own individual rotation axis 206, which as an option are positioned substantially parallel to each other, as for example depicted in FIG. 2D. As shown in FIG. 2B, as a further option, the rotation axes of the rotation members 204 may be positioned on an imaginary circle 208, with a circle center 210.

Each rotation member 204 comprises a radially extending finger 212, of which a distal end 214 may be the furthest extending portion of the finger 212 relative to the rotation member 204. In this particular embodiment, as an option which may be readily combined with other optional features disclosed herein, the fingers 212 extend eccentrically relative to the rotation axis 206 of their respective rotation member 204.

The radially extending fingers 212 may be rigidly attached to the rotation member 204. Optionally, one or more of the fingers may be replaceable. As such, fingers may be substituted by other fingers which have a different functionality. Also, the fingers may be subject to wear, and having the finger replaceably connected to the rotation member may allow convenient replacement of a worn finger.

To connect the end effector 200 to a robot arm or to a robot frame, a frame connection module 218 may be provided to connect the tool frame 202 to the robot arm and/or to the robot frame. The connection may for example be constituted using one or more screws, bolts, nuts, welds, any connection type, or any combination thereof.

For rotating the rotation members, as an example, each rotation member 204 is provided with a gear section 220. The gear sections 220 comprise a plurality of teeth extending radially outward. A drive member 222 is provided as an option for rotating the rotation members 204. The drive member 222 also comprises a gear section, with teeth which are meshed with the teeth of the gear sections of the rotation members 204.

By virtue of the meshed teeth, the drive member 222 is rotationally coupled with each rotation member 204. As such, only a single actuator such as an electric motor may be required for rotating all rotation members 204. Alternatively, rotation members 204 may be driven individually with individual motors.

A rotation axis 224 of the drive member 222 may be substantially aligned with the center 210 of the circle 208, as for example depicted in FIG. 2A. Furthermore, this rotation axis 224 may be substantially parallel to the rotation axes 206 of the rotation members 204.

FIGS. 2A, 2B, 2C and 2D depict the mechanical weed destruction tool 200 in an opened state, wherein a space 227 is present between the fingers 212, as depicted in FIG. 2C. For example by manipulating the position of the tool 200, a weed can be positioned in the space 227.

FIGS. 3A, 3B, 3C and 3D depict the mechanical weed destruction tool 200 in closed states. In a closed state, a weed positioned in the space 227 may be gripped or cut. In particular, FIG. 3A depicts a first closed state, and FIG. 3B depicts a second closed state.

FIGS. 2B and 3B only show the rotation members 204 and fingers 212 for clarity and conciseness of the figures. The fingers 212 in these particular embodiments comprise an end plane 226, a first side plane 228 and a second side plane 230. The first side plane 228 and second side plane 230 taper towards the end plane 226, and may be oriented substantially parallel to rotation axis 206 of their respective rotation member 204. As shown in FIGS. 2B and 3B, the rotation members 204 may be angularly spaced apart at a constant angle, in this example 120 degrees relative to each other.

In the first closed state of FIG. 3A, the first side planes 228 and the end planes 226 abut or at least are placed closely together facing towards each other. In the second closed state of FIG. 3B, the second side planes 230 and the end planes 226 abut or at least are placed closely together facing towards each other.

Any of the first side plane 228 and the second side plane 230 may be a gripper plane or a cutting plane. A cutting plane may comprise one or more sharp protrusions for cutting into a weed. When a cutting plane is provided, an end plane may comprise a groove in which the sharp protrusion may fall in the closed state. Alternatively or additionally, an end plane may comprise one or more sharp protrusions for cutting into weed and/or for gripping weed. A gripper plane may comprise a high friction material and/or any number of gripping protrusions which allows a weed to be gripped.

To transition between the open state and the first closed state, the rotation members may be rotated in a first direction, which may be a clockwise direction. To transition between the open state and second closed state, the rotation members may be rotated in a second direction, which may be a counter-clockwise direction.

The first closed state may be a gripping state, and the first end planes 226 may be gripping planes arranged to grip a weed. When a weed is gripped between the fingers 212, an upward motion of the end effector may cause the weed to be pulled out of the soil.

The second closed state may be a cutting state, and the second end planes 226 may be cutting planes arranged to cut a weed. A cutting plane may for example be provided with a pointy and/or sharp knife edge. Alternatively, the second closed state may be an alternative gripping state.

Any one of the closed states may be used as a punching state, wherein punching the end effector down on a weed may also be used for destroying the weed. In any closed state, the fingers may form a substantially cylindrical outer surface, as visible in FIG. 3C, or even a substantially conical outer surface.

As visible in FIGS. 2C and 3C, as an even further option, the fingers 212 may protrude away from the tool frame 202. In particular, the finger may extend beyond a rotation member body 205 at least partially in a direction substantially parallel or parallel to the rotation axis 206 of the rotation member 204.

In the description above, it will be understood that when an element such as layer, region or substrate is referred to as being "on" or "onto" another element, the element is either directly on the other element, or intervening elements may also be present. Also, it will be understood that the values given in the description above, are given by way of example and that other values may be possible and/or may be strived for.

Furthermore, the invention may also be embodied with less components than provided in the embodiments described here, wherein one component carries out multiple functions. Just as well may the invention be embodied using more elements than depicted in the Figures, wherein functions carried out by one component in the embodiment provided are distributed over multiple components.

It is to be noted that the figures are only schematic representations of embodiments of the invention that are given by way of non-limiting examples. For the purpose of clarity and a concise description, features are described herein as part of the same or separate embodiments, however, it will be appreciated that the scope of the invention may include embodiments having combinations of all or some of the features described.

The word 'comprising' does not exclude the presence of other features or steps than those listed in a claim. Furthermore, the words 'a' and 'an' shall not be construed as limited to 'only one', but instead are used to mean 'at least one', and do not exclude a plurality.

A person skilled in the art will readily appreciate that various parameters and values thereof disclosed in the description may be modified and that various embodiments dis-closed and/or claimed may be combined without departing from the scope of the invention.

The invention claimed is:

1. An end effector for a weeding robot, comprising:
an end effector frame configured to connect to a robot arm or a robot frame;
a plurality of rotation members, each rotation member being rotatably connected to the end effector frame, and each rotation member being configured to rotate around an individual rotation axis,
wherein the rotation axes are disposed on a circle, and wherein each rotation member comprises a radially extending finger, of which distal ends substantially extend to a center of the circle on which the rotation axes are disposed when the end effector is in a closed state, and which distal ends substantially extend away from the center of the circle on which the rotation axes are disposed when the end effector is in an open state to define a space between the fingers configured to receive a weed therein,
wherein at the distal end, each radially extending finger comprises an end plane and one or two side planes, wherein in the closed state, the respective end plane of each of the fingers engages a side plane of an adjacent one of the fingers for engaging the received weed therebetween.

2. The end effector according to claim 1, further comprising a drive member, rotatably connected to the end effector frame and rotationally coupled to each rotation member, wherein a rotation axis of the drive member is aligned with the center of the circle on which the rotation axes of the rotation members are disposed.

3. The end effector according to claim 2, wherein the drive member and the rotation members each comprises a gear section, and wherein the gear section of the drive member is meshed with the gear sections of each of the rotation members.

4. The end effector according to claim 1, wherein the radially extending fingers extend eccentrically relative to the rotation axis of the respective rotation member by which the radially extending finger is comprised.

5. The end effector according to claim 1, wherein at the distal end, the number of the side planes is two and the side planes are tapered towards the end plane.

6. The end effector according to claim 5, wherein:
a first of the two side planes is a gripper plane;
a second of the two side planes is a cutting plane;
in a first closed state, gripper planes of the radially extending fingers engage end planes of adjacent radially extending fingers; and
in a second closed state, cutting planes of the radially extending fingers engage end planes of another adjacent radially extending finger.

7. The end effector according to claim 5, wherein:
a first of the two side planes is a gripper plane;
a second of the two side planes is an alternative gripper plane;

in a first closed state, gripper planes of the radially extending fingers engage end planes of adjacent radially extending fingers; and
in a second closed state, alternative gripper planes of the radially extending fingers engage end planes of another adjacent radially extending finger.

8. The end effector according to claim 5, wherein at least one of the first side plane and the second side plane is oriented parallel to the rotation axis of the respective rotation member.

9. The end effector according to claim 1, wherein the fingers extend away from the end effector frame beyond the rotation members.

10. A weeding robot, comprising:
a robot frame;
a propulsion module for moving the robot frame; and
a robot arm connected to the robot frame, with an end effector according to claim 1 connected at a distal end of the robot arm.

11. The weeding robot according to claim 10, further comprising a vision module for obtaining weed data, and a controller for controlling the robot arm and the end effector based on the obtained weed data.

12. The weeding robot according to claim 11, wherein the controller is configured to operate the end effector in at least one of a cutting mode and a gripping mode based on obtained weed data.

13. The weeding robot according to claim 10, further comprising a rotational actuator for rotating a rotational member of the end effector.

14. A method for operating an end effector of a weeding robot, comprising:
obtaining weed data on a weed using a vision module of the weeding robot;
determining, based on the weed data, whether to perform at least one of:
a first mechanical destruction action on the weed using the end effector;
a second mechanical destruction on the weed using the end effector;
a third mechanical destruction action on the weed using the end effector; and
performing the determined action or actions for mechanically destroying the weed,
wherein the step of performing the first mechanical destruction action comprises rotating rotation members of the end effector in a first direction, and the step of performing the second mechanical destruction action comprises rotating rotation members of the end effector in a second direction.

15. The method according to claim 14, wherein the first mechanical destruction action is a gripping action.

16. The method according to claim 14, wherein the second mechanical destruction action is an alternative gripping action.

17. The method according to claim 14, wherein the second mechanical destruction action is a cutting action.

18. The method according to claim 14, wherein the third mechanical destruction action is a punching action.

* * * * *